Jan. 31, 1928. 1,657,512
K. R. MANVILLE
INTERNAL COMBUSTION ENGINE JACKET
Filed April 14, 1925
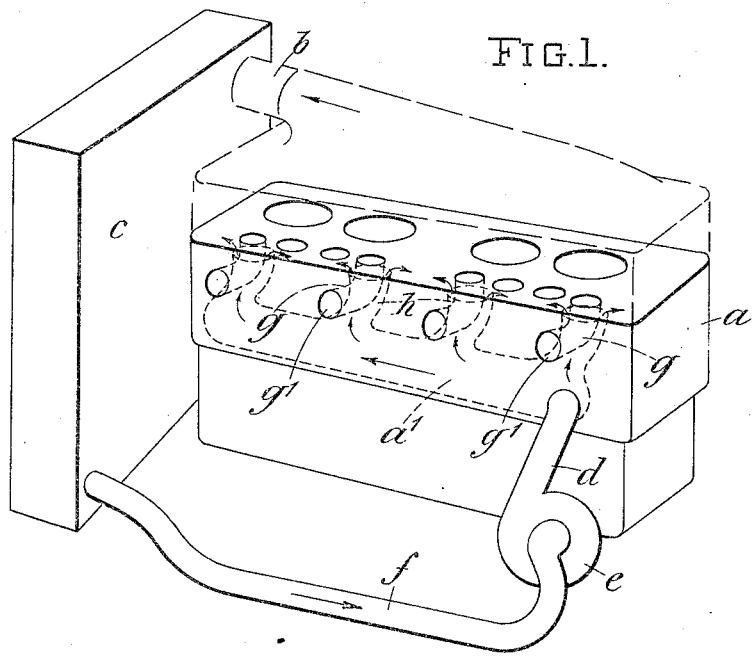
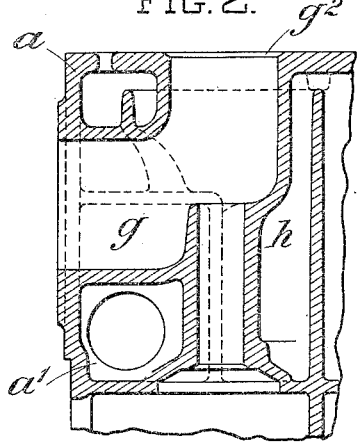
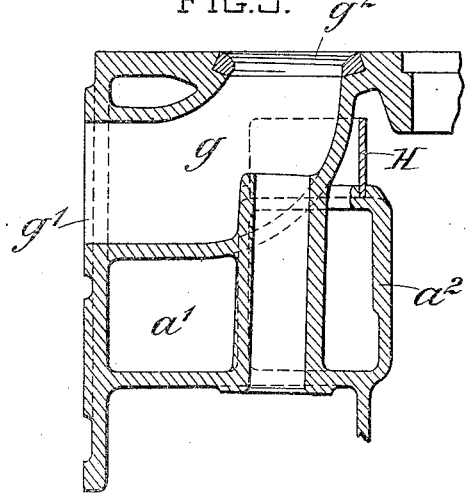
INVENTOR.
KEITH R. MANVILLE
BY
Redding, Greeley, O'Shea & Campbell ATTORNEYS.

Patented Jan. 31, 1928.

1,657,512

UNITED STATES PATENT OFFICE.

KEITH R. MANVILLE, OF ELMHURST, NEW YORK, ASSIGNOR TO INTERNATIONAL MOTOR COMPANY, OF NEW YORK, N. Y., A CORPORATION OF DELAWARE.

INTERNAL-COMBUSTION-ENGINE JACKET.

Application filed April 14, 1925. Serial No. 22,935.

This invention relates to internal combustion engines and more particularly to water cooled engines in which one or more cylinders are provided with jackets through which a cooling medium, such as water, is circulated for the purpose of carrying away the heat generated in the operation of the engine. The invention has for its particular object to provide a construction which shall ensure the flow of the cooling medium to those portions of metal of highest temperature of the engine for intimate heat interchange. One of such highly heated portions, with respect to each cylinder, is the exhaust valve and passage leading therefrom for the escape for the exhaust gases from the combustion chamber. According to the invention the cooling medium is conducted to the vicinity of the exhaust passage by a conduit leading from the intake of the cooling medium and branches, in the case of a multi-cylinder engine, are provided to conduct cooling medium from the aforesaid conduit directly to the region of the exhaust valve seat and the neighboring portions of the passage leading therefrom. The invention also has to do with means whereby an engine jacket not provided initially with such cooling medium conducting means may be adapted for such cooling according to the present invention. In order that the invention may be more clearly understood and readily carried into effect the same will now be described more fully with reference to the accompanying drawings illustrating a preferred embodiment thereof in which:

Figure 1 is a somewhat diagrammatic view showing the water jacket surrounding a multi-cylinder internal combustion engine and the means for conducting the water between the water jacket and a radiator.

Figure 2 is a fragmentary view in section taken in the diametric vertical plane of the exhaust valve seat of the engine shown in Figure 1 and illustrating the manner of conducting the cooling medium in contact with the walls of the exhaust valve.

Figure 3 is a view similar to Figure 2 except that it shows the means for adapting water jackets originally constructed without the additional feature forming the subject matter of the present invention, by the addition of a supplemental shield forming a well through which the water may be conducted to the vicinity of the exhaust valve.

Referring first to Figure 1, the water jacket indicated, in general at $a$, of a multi-cylinder internal combustion engine is shown as provided with the usual water outlet $b$ leading to radiator $c$ and receiving the water which has been cooled by the radiator through the conduit $d$ leading from the pump $e$ which is adapted to draw cool water from the lower part of the radiator through the pipe $f$ and deliver it into a longitudinally extending passage $a'$ formed in the water jacket. The water passage $a'$ formed in the water jacket $a$ extends longitudinally of the bank of cylinders immediately beneath the passages $g$ conducting exhaust gases from the combustion chamber, not shown, to the exhaust manifold. The exhaust manifold is not indicated in the drawings but it will be understood that it extends longitudinally of the bank of cylinders and is in communication with the outlets $g'$ shown as four in number in Figure 1. The seat for an exhaust valve is indicated at $g^2$ in Figure 2. Heretofore an inner wall $a^2$, Figure 3, has been formed in the water jacket and this has formed what is substantially a conduit $a'$ for the relatively cold water which has conducted the water in contact with the walls of the passage for the exhaust gases near the outlet $g'$ thereof but the wall $a^2$ has only been of such height as to permit the flow of the cooling medium away from the walls of the exhaust passages adjacent to the valve seat which obviously is the hottest portion. According to the present invention it is proposed to form what is in effect a well $h$ leading from the longitudinally extending duct $a'$ and extending upwardly about the passage $g$ for the exhaust gases and terminating near the seat $g^2$ so that water flowing through the passage $a'$ is brought in contact with the wall with each exhaust passage throughout substantially its entire length and contacts with the walls of the passage in the immediate region of the exhaust valve seat before being permitted to escape into the water jacket as a whole. In the previous constructions the cooling medium from the pump $e$ came first in contact with the walls of the nearest exhaust passage and then flowed on to contact in turn with the walls of the more remote passages thus becoming more highly heated as it proceeded through the passage $a'$ to provide a very unequal cooling effect upon the respective exhaust passages as will be obvious. By the present construction the flow of substantially cool water is assured in contact with each exhaust passage since by the provision of the wells $h$ the water flowing through the respective wells and taking up heat from the respective exhaust passages does not come in contact with neighboring exhaust passages.

It is also contemplated to provide means whereby water jackets as at present constructed may be adapted along the lines of the present invention. To this end a shield or jacket H may be secured in any convenient manner to the upper portion of the wall $a^2$ (Figure 3) to partially surround the exhaust passage $g$ and be of such a height sufficient to ensure the contact of the cooling water with the wall of the exhaust passage in the region of the exhaust valve seat $g^2$ as in the previously described construction.

By the present invention fresh substantially cool water is conducted in contact with the wall of each exhaust passage throughout its entire length and the cylinder block in the region of the exhaust valve seat is similarly cooled while the water thus conducted and thus taking up heat from the exhaust passage is not brought in contact with any other exhaust passage.

Various modifications may be made in the configuration of the passages formed in the water jacket according to the present invention and no limitation is intended by the foregoing description of the accompanying drawings except as indicated in the appended claims.

What I claim is:

1. In a casting for an internal combustion engine, an exhaust passage therein, the casting being formed with walls enclosing the passage, a jacket carried with the casting and mounted about the exhaust passage to form a well, and means connecting the well directly with the cooling fluid supply passage whereby the cooling fluid is directed through a restricted chamber between the jacket and the exhaust passage and subsequently comes in contact with the associated mechanism and parts of the casting.

2. In a casting for an internal combustion engine, an exhaust passage therein, the casting being formed with walls enclosing the passage, a jacket carried with the casting and extending upwardly to form a well surrounding the exhaust passage, the upper end of the well being separated from the passage to permit the circulating fluid to flow over the top of the jacket, a fluid inlet conduit contained in the casting and connected with the well at its lower end, and ports for permitting the escapement of the fluid from the casting in its continued circulation about the associated mechanism.

3. In a casting for an internal combustion engine and cooling system therefor, a plurality of exhaust passages the casting being formed with walls enclosing the exhaust passages, a longitudinally extending passage below the exhaust passages and forming the supply duct for the cooling liquid, a jacket forming a well and surrounding each passage cast with the block and extending up in close proximity to the valve seat but not contacting at its upper edge with the passage or block, and connections between the wells and the supply duct whereby in the circulation of the liquid, the exhaust passages are cooled along their entire length and the liquid then flows over the upper edges of the wells and circulates about the associated mechanism.

This specification signed this 11th day of April, A. D. 1925.

KEITH R. MANVILLE.